United States Patent [15] 3,690,143
Day [45] Sept. 12, 1972

[54] SELF CALIBRATING TIDAL VOLUME IMPEDANCE PNEUMOGRAPH

[72] Inventor: Christopher C. Day, Newtonville, Mass.

[73] Assignee: American Optical Corporation, Southbridge, Mass.

[22] Filed: Nov. 27, 1970

[21] Appl. No.: 93,068

Related U.S. Application Data

[63] Continuation-in-part of Ser. No. 28,442, April 14, 1970, Pat. No. 3,678,296, and a continuation-in-part of Ser. No. 25,353, April 3, 1970, Pat. No. 3,677,261.

[52] U.S. Cl. .................................. 73/1 R, 128/2.08
[51] Int. Cl. ............................................. G01l 27/00
[58] Field of Search ........................ 73/1 R; 128/2.08

[56] References Cited

UNITED STATES PATENTS 3,433,217  3/1969  Rieke ....................... 128/2.08
3,527,205  9/1970  Jones ....................... 128/2.08
3,559,638  2/1971  Potter ...................... 128/2.08

*Primary Examiner*—Louis R. Prince
*Assistant Examiner*—William A. Henry, II
*Attorney*—William C. Nealon, Noble S. Williams, Robert J. Bird and Bernard L. Sweeney

[57] ABSTRACT

A method of automatically calibrating an electronic respiration monitoring system including a pneumograph responsive to changes in thoracic inpedance of a breathing patient for providing an analog signal proportional to breath volume and a volume-calibrated inflatable bag. The method comprises the steps of: (a) operatively associating the pneumograph with the thorax of the patient; (b) positioning said bag in association with the patient with the bag being arranged to capture gases exhaled by the patient; (c) determining maximum filling of said bag; and (d) automatically calibrating said system upon the filling of the bag.

3 Claims, 6 Drawing Figures

PATENTED SEP 12 1972

INVENTOR.
CHRISTOPHER C. DAY
BY
William C. Nealen
ATTORNEY

SELF CALIBRATING TIDAL VOLUME IMPEDANCE PNEUMOGRAPH

CROSS-REFERENCE TO RELATED APPLICATION

This application is a continuation-in-part of applications, Ser. No. 28,442, now U.S. Pat. No. 3,678,296, and 25,353, now U.S. Pat. No. 3,677,261.

The subject matter of the present invention is related to the preceding two co-pending applications: Ser. No. 28,442, filed Apr. 14, 1970, entitled "Electrical Signal Slope Polarity Change Detector"; and Ser. No. 25,353, filed Apr. 3, 1970, entitled "An Improved Impedance Pneumograph". Information disclosed in these two patent applications is incorporated herein by reference.

Both applications were filed by the applicant of the present invention. Those two applications, as well as the present application, are all assigned to the same assignee. Benefits of 35 USC 120 are claimed for the present invention with respect to the earlier applications.

BACKGROUND OF THE INVENTION

1. Field of the Invention

The present invention relates in general to the storing and displaying of successive peak values of an analog signal. More particularly, the present invention relates to apparatus and to a method for calibrating the apparatus for storing and displaying successive peak values of an analog signal corresponding to tidal volume of a breathing patient.

2. Description of the Prior Art

The present invention relates to the determining of volume of exhaled breath of a patient. Known devices for performing this task include "spirometers". A spirometer is a measuring instrument usually having inflatable structure operatively coupled to a readout device used to measure volume of a specific exhaled breath. After a breath is exhaled, the operator of the spirometer correlates volume with either a meter reading, paper tracing, or other analog readout apparatus, and volume is thus measured.

Unfortunately, the taking of spirometer measurements presents a calibration problem. Calibration of a spirometer prior to the taking of a measurement usually requires an operator to manually adjust a gain control. This adjustment requires either a circuit arranged to hold voltage that is proportional to measured respired breath, or alternatively requires a trial and error manipulation of gain control with each patient exhalation until satisfactory calibration is achieved.

These spirometer calibration procedures are cumbersome and inefficient which usually restrict the use of spirometers to laboratories or to a teaching environment. The medical field needs a device which measures breath volume and which can be automatically calibrated.

Also, the need exists for a simple calibration procedure that would allow calibration of the instrument by the patient being monitored.

The present invention overcomes the aforementioned shortcomings and problems of prior art. The present invention is an electronic instrument which can be added to almost any impedance pneumograph which has a DC restored analog signal available as one of its outputs.

An impedance pneumograph can sense thoracic impedance changes due to respiration and display these changes as a varying analog electrical signal. But, the signal usually varies from patient to patient since different people have different impedance characteristics. Each patient can provide a different peak voltage value corresponding to exhalation, even if the volumes of exhalation are equal. Thus, gain calibration by the particular patient being monitored is needed.

The present invention utilizes a fixed volume disposable bag in a method of self-calibration that is so simple that the instrument can be set up and used by such unskilled personnel as the monitored patient himself. Thus, due to simplicity of calibration of the present invention and for other reasons, continuous monitoring of respired volume is now made available in medical areas where use of such an instrument was previously unpractical. The present invention can measure exhaled volume in various selected ways, including breath to breath volume measurements and average volume measurements.

SUMMARY OF THE INVENTION

The present invention relates to a measurement system that comprises self-calibration apparatus, a slope polarity change detector for detecting each successive occurrence of input signal slope polarity change, and a readout device. Two switches, two capacitors and proper buffering are used in conjunction with the detector.

In the operation of making a measurement with this system, at each occurrence of a signal valley a first switch is closed and a second switch is opened in response to operation of the detector. This first switching action permits charging of a first capacitor towards a peak value of input analog signal. At each occurrence of a signal peak the first switch is opened and the second switch is closed in response to operation of the detector.

The capacitors and switches are so arranged that this second switching action transfers stored peak voltage from the first capacitor to the second capacitor. At this point in time (when the first switch opens and the second switch closes) the input analog signal takes on a negative slope, and its instantaneous value is falling from a peak downwards to a valley. During this time, a value of peak voltage which is temporarily stored on the second capacitor is displayed on the readout device.

At the occurrence of the next valley, the first switch is made to close again, and the second switch is made to open again. This causes repetition of the cycle of switching, storage and display.

A calibration feature is employed which requires manual operation of a spring-loaded calibration switch. When the switch is operated, it causes the system to achieve zero gain temporarily and causes discharge of residual voltages on various capacitors.

When used in conjunction with an impedance pneumograph, the calibration apparatus includes a fixed volume bag. The calibration procedure is straightforward enough for a patient to self-calibrate the instrument without other assistance. The patient merely depresses and releases a spring-loaded button-switch and thereafter exhales into the bag to inflate it to full volume, whereupon the bag triggers a micro switch.

The micro switch is electrically connected to the rest of the system. In conjunction with the slope reversal detector and with a motor driven potentiometer servo loop, the micro switch causes system gain to be automatically set. Thus, a value displayed on the readout device during the calibration procedure is equal to the value of volume of the calibrated fixed volume disposable bag.

After system gain is set, a reset device is automatically triggered which electrically removes the calibration circuitry from the system. Thus, the system is automatically readied for normal tidal volume measurement.

It is thus an object of the present invention to provide new and improved apparatus and method for storing and displaying successive peak values of an electrical analog input signal.

An additional object of the present invention is to provide a new and improved apparatus and method for measuring and displaying tidal volume of a breathing patient.

It is a further object of the present invention to provide a new and improved calibration apparatus and a calibration method therefor to be utilized in the making of tidal volume measurements of a breathing patient.

Other objects and advantages of the present invention will become apparent to one having reasonable skill in the art after referring to the detailed description of the appended drawings wherein:

DETAILED DESCRIPTION OF THE PREFERRED EMBODIMENT

Figure 1:
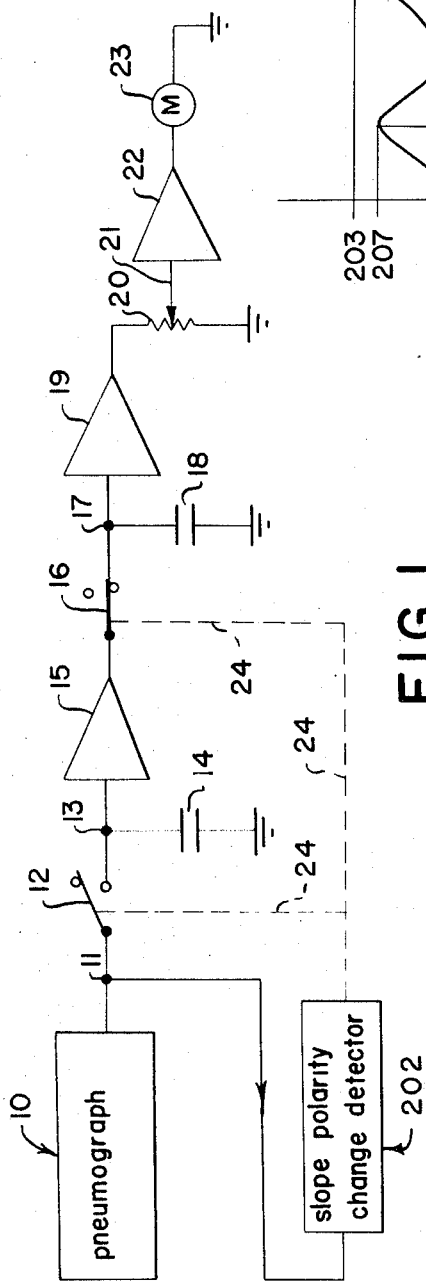
FIG. 1 is a part schematic, part block diagram, of an illustrative embodiment of the present invention without self-calibration apparatus.

In FIG. 1, pneumograph 10 can be of the type described in my copending applications, Ser. Nos. 25,353 and 28,442, and slope polarity change detector 202 can be of the type disclosed in my copending application, Ser. No. 28,442. Pneumograph 10 provides a respired volume analog electrical output signal at junction 11 which is conducted to an input of slope polarity change detector 202 and is also conducted to switch 12.

Detector 202 is shown schematically as controlling switch 12 and switch 16 by dashed lines 24. When switch 12 is open, switch 16 is closed (as shown). Capacitor 14 is connected between ground and junction 13, the junction of switch 12 and an input to amplifier 15. Capacitor 18 is connected between ground and junction 17, the junction of switch 16 and an input to amplifier 19.

The output from amplifier 19 is conducted to one end of potentiometer 20, the other end being grounded. Wiper 21 of potentiometer 20 provides an input to amplifier 22, whose output is conducted to readout device 23 for displaying peak values of analog signal input. Readout device 23 can be an analog or digital meter, display, recorder, etc.

Figure 6:
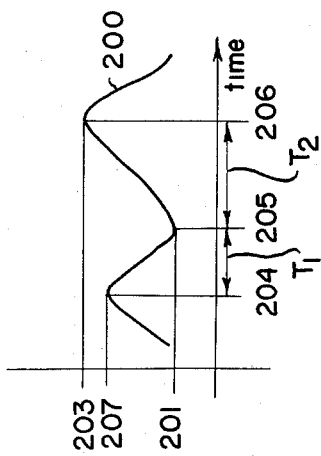
FIG. 6 is a waveform graph representing the output signal from the pneumograph of FIG. 1.

Consider the output signal from pneumograph 10 to have a general shape of waveform 200 shown in FIG. 6. Time T1 corresponds to time required for the patient to inhale and time T2 corresponds to time required for the patient to exhale. Slope polarity change detector 202 provides an abruptly changed output at each of times 204, 205 and 206. These times correspond respectively to peak 207, valley 201 and peak 203. For every abruptly changing output of detector 202, switches 12 and 16 change state.

Consider the input signal to detector 202 at a time slightly prior to T1. At this prior time, switch 12 is closed and switch 16 is open, since the switches are so arranged to operate (detailed description of the operation of the switches follows later). The positive slope corresponds to patient exhalation. When the patient stops exhaling, the analog output signal from pneumograph 10 is at a peak value corresponding to peak 207. At this point in time, detector 202 causes switches 12 and 16 to change state, and this will be shown in more detail in the description of FIG. 2. Switch 12 opens and switch 16 closes.

Thus, voltage on capacitor 14 (which corresponds to peak 207) is transferred (after amplification by amplifier 15) through closed switch 16 to capacitor 18. Switch 16 remains closed for time T1, during which the patient is inhaling.

At time 205, signal 200 is at valley 201 corresponding to termination of inhaling and detector 202 again causes switches 12 and 16 to change state. Swtich 16 opens and switch 12 closes. Capacitor 18 does not discharge, when switch 16 is open but maintains peak 207 voltage for the duration of time T2. Capacitor 14 is charged from its value of residual voltage (near the value of peak 207) to a higher value corresponding to peak 203. If peak 207 were higher than peak 203, capacitor 14 would have discharged instead. During T2, the patient is exhaling once again.

Thus, the procedure of repetitively storing successive peak values of voltage on capacitor 14 corresponding to successive volumes of breath exhaled, and thereafter repetitively transferring each successive value of voltage to capacitor 18 at each time corresponding to the beginning of an inhalation continues in this manner.

Output from amplifier 19 is divided down by gain adjustment potentiometer 20 and is further amplified in amplifier 22. Potentiometer 20 is used to automatically set system gain and will be described in detail in FIG. 2. Output from amplifier 22 feeds readout device 23.

Figure 2:
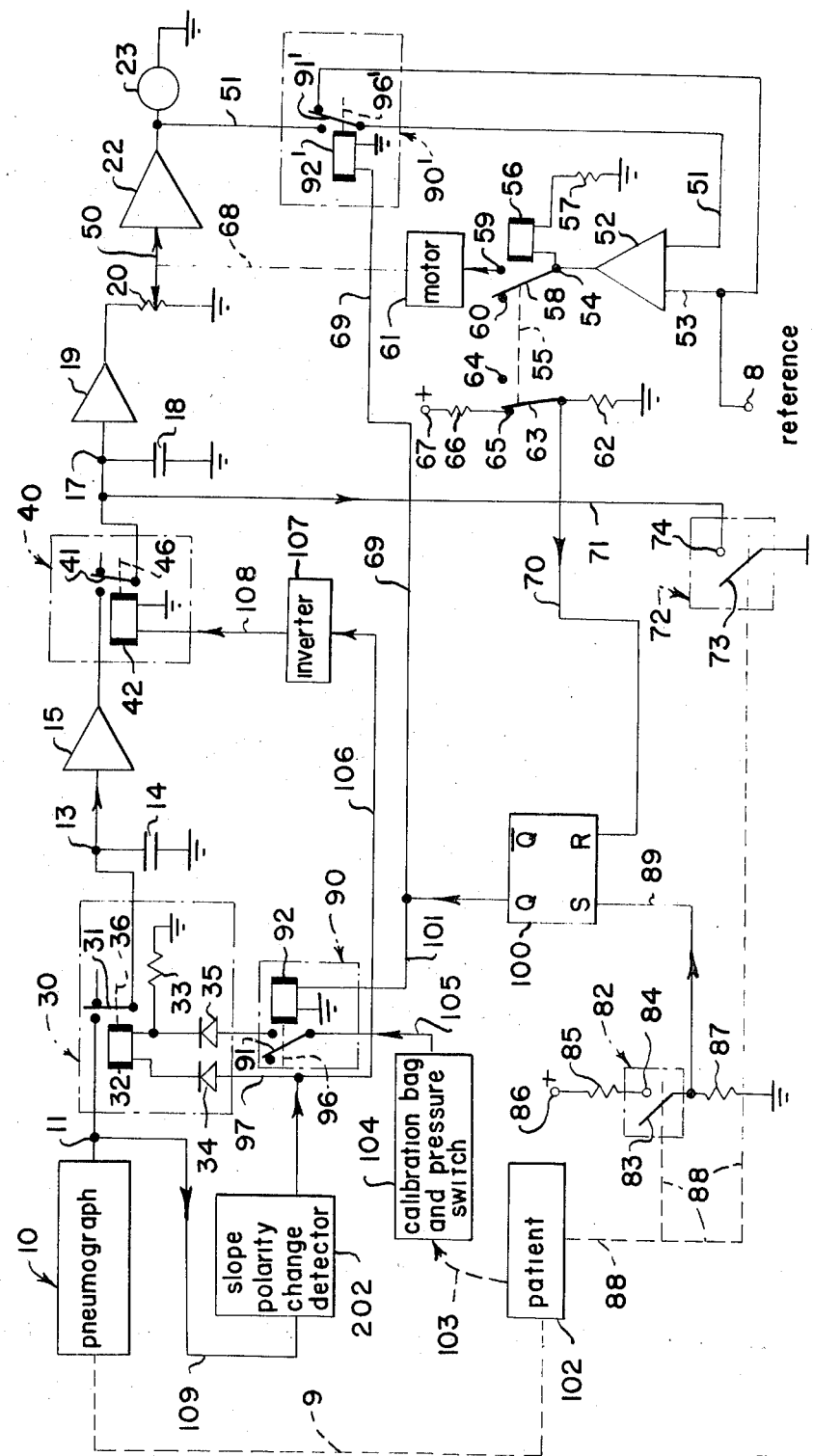
FIG. 2 is a part schematic, part block diagram, of the preferred embodiment of the present invention, wherein self-calibration apparatus is depicted and interfaces with the patient.

In the discussion thus far, calibration of the system has not been covered. In FIG. 2 a more detailed embodiment including automatic calibration apparatus is presented and a discussion thereof follows.

In FIG. 2 the following components are unchanged from FIG. 1: pneumograph 10, slope polarity change detector 202, capacitors 14 and 18, amplifiers 15, 19 and 22, potentiometer 20 and readout device 23. Switches 12 and 16 of FIG. 1 are respectively functionally equivalent to switches 30 and 40 of FIG. 2. Switches 30 and 40 are implemented with relays, but these switches and other switches utilizing relays herein depicted all can be switches of a different variety. For example, they could be solid state switches. Relays are shown for purposes of clarity of illustration.

Initially, consider the arrangement of circuitry in the upper half of FIG. 2. This half of the illustrated circuitry in general comprises peak value storage and display circuitry and does not in general comprise calibration circuitry. As before, pneumograph 10 provides on conductor 109 to detector 202 an output signal having the general shape depicted in FIG. 6. Pneumograph output 11 is also conducted to switch 30.

Output of detector 202 is conducted via conductor 97 to the anode of diode 34 in switch 30. Output of detector 202 is also conducted via conductor 106 to the input of inverter 107. Output of inverter 107 is conducted via conductor 108 to one end of relay coil 42 in switch 40.

In switch 30, the cathode of diode 34 is connected to one end of relay coil 32 the other end being connected to a junction comprised of a cathode of diode 35 and one end of resistor 33. The other end of resistor 33 is connected to ground. Relay coil 32 is magnetically coupled (as depicted by dashed lines 36) to movable element 31.

Junction 13 is comprised of element 31, input to amplifier 15, and one side of capacitor 14. The other side of capacitor 14 is grounded and the output of amplifier 15 is connected to switch 40.

In switch 40 relay element 42 is conducted to ground. It is magnetically coupled (as depicted by dashed lines 46) to movable element 41. Movable element 41 is connected to junction 17 comprising an input to amplifier 19, one side of capacitor 18, and conductor 71. The other side of capacitor 18 is grounded and conductor 71 goes to calibration circuitry. Output from amplifier 19 is conducted to one end of potentiometer 20, the other end being connected to ground. Wiper 50 of potentiometer 20 is motor driven and provides an input to amplifier 22 whose output is fed to readout device 23.

In considering the operation of the upper half portion of FIG. 2 momentarily ignore diode 35 and the circuitry associated therewith. Suppose a signal on conductor 109 is increasing as shown in the time period before T1 of FIG. 6. For a positive slope input to detector 202 there is a positive voltage output. (For a negative slope input, there is a zero volt output.)

The positive voltage output is conducted to two places, one being diode 34. The output voltage causes current flow through diode 34, relay coil 32 and resistor 33 to ground. Current flow through coil 32 causes element 31 to close. Thus, an increasing amplitude of input signal is applied through element 31 to capacitor 14 as previously described.

The second destination for output voltage of detector 202 is inverter 107. Voltage on conductor 108 is inverted from voltage on conductor 106 (a positive DC value) and is made approximately equal to zero volts. Likewise, if ground or zero volts is applied to the inverter, output of the inverter on conductor 108 would be a positive value of voltage. There is nothing unusual about inverter 107 and it could be a simple transistor switch. Inverter circuits are well-known in the art and should need no further elaboration. Thus voltage applied to relay coil 42 for this time period prior to T1 is zero and element 41 does not close.

At time 204 when signal 200 is at peak 207, detector 202 provides a zero volt output on conductors 97 and 106. This output causes element 31 to open, and causes relay coil 42, due to inversion by inverter 107 to pass a DC current therethrough causing element 41 to close. Thus, peak voltage 207, stored on capacitor 14, is amplified by amplifier 15 and is conducted to capacitor 18 via closed switch 40.

Peak voltage 207, temporarily stored on capacitor 18, is amplified by amplifier 19. The output therefrom is conducted via potentiometer 20 and wiper 50 to amplifier 22 wherein the signal is further amplifier. The output of amplifier 22 is displayed by readout device 23.

Figure 3:
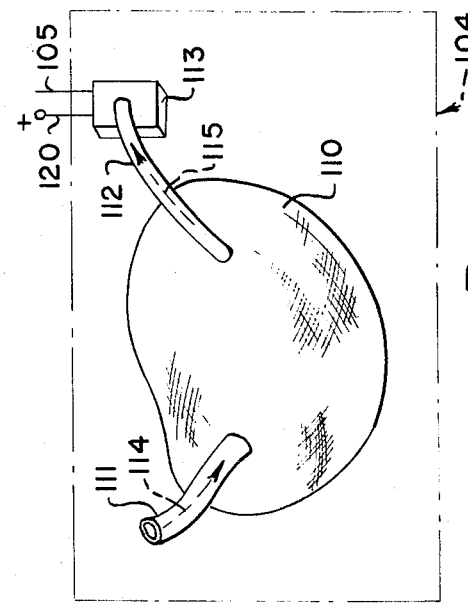
FIG. 3 depicts an illustrative embodiment of a calibration bag and pressure switch utilized in the self-calibration apparatus of FIG. 2.

Departing momentarily from discussion of the operation of peak value storage and display circuitry, consider the arrangement of calibration apparatus shown generally in the lower half portion of FIG. 2. Patient 102 exhales, as depicted by dashed line 103, into calibration bag and pressure switch 104 and simultaneously provides a thoracic impedance change input as depicted by dashed line 9 to pneumograph 10. Calibration bag and pressure switch 104 is further detailed in FIG. 3 wherein calibration bag 110 is shown to mate with two tubes. Tube 111 is an ingress tube through which exhaled air (depicted as dotted arrow 114) is passed. Egress tube 112 is used for passing respired breath out of the bag, (depicted by dotted arrow 115). Tube 112 is operatively connected to pressure switch 113.

Figure 4:
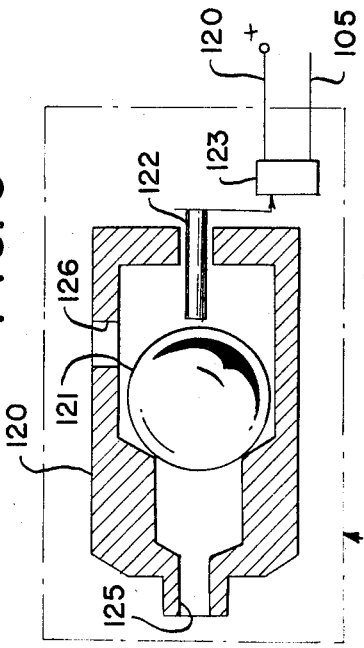
FIG. 4 depicts a particular arrangement for the pressure switch utilized in FIG. 3, which in turn utilizes a micro switch, also shown.

Pressure switch 113 is a micro switch which is further detailed in FIG. 4. In FIG. 4 aperture 125 passes respired breath from tube 112. Spherical valve 121 is moved by incoming breath in a direction to make contact with rod 122. Rod 122 is displaced thereby and causes micro switch 123 to operate. Aperture 126 is used for exiting respired breath after valve 121 moves from its depicted position. Spherical valve 121 does not move until bag 110 is completely filled to its fixed calibrated volume. Thus, after filling bag 110 completely, a trigger signal is generated which is used to cause termination of charging of capacitor 14. It should be understood that pressure switch 113 is illustrative, and a specific arrangement of elements of the switch can take various forms, one of which is depicted in FIG. 4.

Returning to FIG. 2, and to further discussion of the arrangement of the calibration apparatus, patient 102 provides a manual output as depicted by dashed line 88 to spring-loaded calibration switches 82 and 72. Switch 82 is comprised of movable element 83 and terminal 84. Switch contacts must be manually made but upon removal of an externally applied force, such as a force that would be applied by a patient, the movable elements spring open.

Terminal 84 is connected to one end of resistor 85 the other end being connected to positive supply voltage 86. Movable element 83 is connected to one end of resistor 87, the other end being connected to ground. Also, element 83 is connected to the "S" (set) input of flip flop 100 by conductor 89.

The "Q" output of flip flop 100 is connected by conductor to one end of relay coil 92 located in "bag-full" enable switch 90. The other end of coil 92 is connected to ground. Current flow through coil 92 causes element 91 to make contact with conductor 105.

Similarly, the "Q" output of flip flop 100 is connected by conductor 69 to one end of relay coil 92' located in switch 90'. Switch 90' operates simultaneously with switch 90. When relay coil 92' is de-energized movable element 91' is connected to referenced potential 8.

Similar to switch 82, switch 72 is comprised of movable element 73 and fixed contact terminal 74. Element 73 is "ganged" with element 83. Fixed element 74 is connected by conductor 71 to junction 17.

One input to differential amplifier 52 is reference voltage 8 applied via conductor 53. This reference voltage is unvarying with respect to ground.

Another input to differential amplifier 52 is either reference potential 8 or is the output of amplifier 22. This input depends on the state of switch 90'. Output of amplifier 52 is connected to relay coil 56. The other end of coil 56 is connected to ground.

Output of amplifier 52 is also connected to movable element 58 shown in an open or de-energized position. When coil 56 is energized, element 58 makes contact with terminal 59 which is connected to an input to motor 61. Motor 61 drives wiper 50. The drive is depicted by dashed line 68.

Relay coil 56 is magnetically linked as depicted by dashed lines 55 to movable elements 58 and 63. Terminal 65 is shown connected to element 63 and to one end of resistor 66. The other end of resistor 66 is connected to positive DC voltage 67. When element 63 is moved by the effect of coil 56 it makes contact with fixed terminal 64. Element 63 is further connected to one end of resistor 62 the other end being connected to ground. And, element 63 is further connected via conductor 70 to "R" (reset) input of flip flop 100.

In operation, patient 102 first depresses switch elements 83 and 73 which cause a step voltage to be applied to S (set) input of flip flop 100 via conductor 89. At the same time, terminal 74 is grounded providing a discharge path for any residual voltage on capacitor 18. Thus the input to amplifier 19 is zero volts, and therefore the output of amplifier 22 is zero volts. Step voltage to S (set) input of flip flop 100 causes Q output to go high, i.e., positive voltage. Positive voltage applied to conductor 101 causes current flow through relay coils 92 and 92' and in turn causes movable elements 91 and 91' to make contact with conductors 105 and 51 respectively. Thus zero volts is applied to one of the inputs of amplifier 52.

Figure 5:
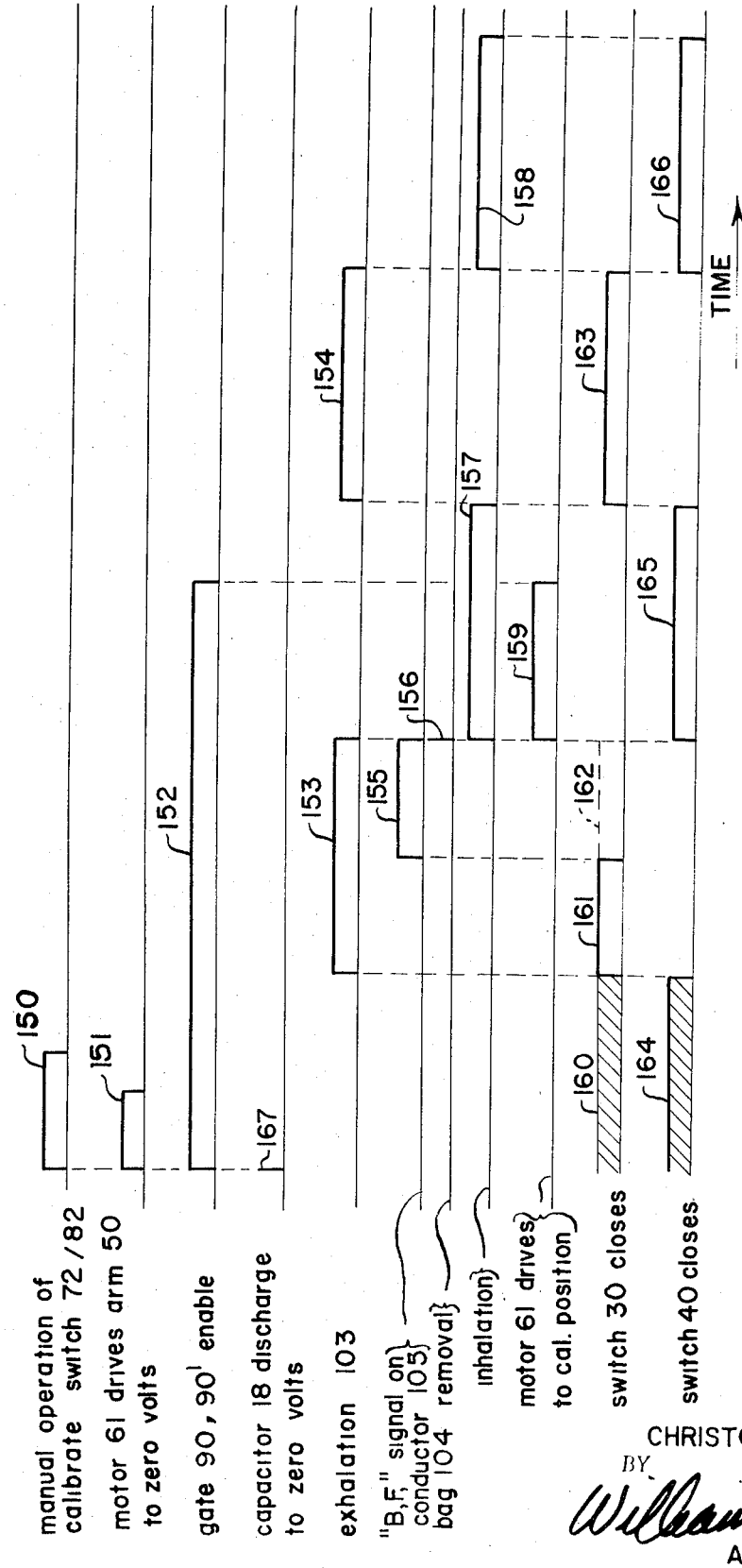
FIG. 5 is a calibration timing chart in which a sequence of manual and automatic operations required to perform self-calibration of the present invention is graphically illustrated. Time is plotted on the abscisa.

The operation of the calibration apparatus in conjunction with the circuitry for storing and displaying peak values of input signal 200 can best be described by reference to FIG. 5. FIG. 5 is the timing chart for the calibration circuitry.

Contact between elements 83 and 73 and fixed terminals 84 and 74 respectively, is illustrated by time duration 150. Beginning of duration 150 illustrates making of contact and end of duration 150 illustrates breaking of contact.

Time duration 151 represents time required for motor 61 to drive wiper 50 to zero position. Beginning of duration 151 is coincident with beginning of duration 150. End of duration 151, which illustrates termination of zeroing motor drive, occurs prior to termination of duration 150. Thus, patient 102 holds switches 82 and 72 in a depressed condition for time sufficient for motor 61 to drive wiper 50 to zero position. The inputs to amplifier 52 during time duration 151 are reference voltage 8 on conductor 53, and zero volts on conductor 51, since output of amplifier 22 is zero at this time. Thus, output from amplifier 52 is amplified reference voltage 8 and the output is sufficient to energize relay coil 56 causing element 58 to contact terminal 59. Amplified reference voltage 8 is extended to motor 61 which drives wiper 50 to zero position. The wiper is not zero positioned at ground, otherwise there could not be any voltage input to amplifier 22 thereafter, regardless of the output magnitude of amplifier 19. The wiper is zero positioned near ground.

Duration 152 represents time during which bag full gate 90 and switch 90' are enabled. Beginning of duration 152 is coincident with beginning of duration 150. This is due to flip flop 100 applying voltage via conductor 101 to relay coil 92 and via conductor 69 to relay coil 92'. Closure of movable contact 91 conductively connects the output of calibration bag and pressure switch 104 with the anode of diode 35 contained in switch 30. Closure of 91' connects output of amplifier 22 to input of amplifier 52.

Duration 167 is short, and represents time required for capacitor 18 to discharge to ground. It occurs simultaneously with closure of switch 72.

After the above described potentiometer-zeroing procedure is performed, patient 102 exhales into bag 104 as shown by dotted line 103. Duration 153 represents time required for patient 103 to completely exhale. Beginning of duration 153 represents beginning of exhalation. Due to action of pneumograph 10 in conjunction with slope polarity change detector 202, a positive voltage is simultaneously applied via conductor 97 to diode 34 and relay coil 32 causing current flow therethrough to ground. This causes element 31 to make contact with junction 11.

Duration 161 represents the contact between element 31 and junction 11, (closure of switch 30). Beginning of duration 161 is simultaneous with beginning of duration 153, (assuming reasonably that closure time of movable element 31 is relatively negligible). Duration 161 is shorter than total exhalation time as depicted by duration 153.

Duration 155 represents time duration of the bag full signal applied to conductor 105 from calibration bag and pressure switch 104. After a certain time, represented by time between the beginnings of duration 153 and 155, calibration bag and pressure switch 104 becomes inflated to maximum volume activating micro switch 123. In FIG. 4, when micro switch 123 is activated, conductor 120 applies positive voltage to conductor 105. This causes current flow in conductor 105 through diode 35 and resistor 33 to ground.

Positive voltage applied to conductor 105 is greater in magnitude than positive voltage applied from slope polarity change detector 202 via conductor 97. Thus, positive potential at the junction of resistor 33 and relay coil 32 is higher than voltage at the anode of diode 34. Diode 34 becomes back biased by a voltage equal to the difference between positive voltage on conductor 97 and positive voltage at the cathode of diode 34. Thus, current flow in relay coil 32 is zero. Switch 30 opens in response thereto, and this is depicted by end of duration 161. Switch 30 opens after a period which is shorter than time for complete exhalation. Switch 30 opens after a period which is proportional to volume of exhaled breath in bag 104. Thus, capacitor 14 is charged to a particular value of voltage unique to the patient being monitored. This voltage is proportional to a fixed and calibrated volume of exhaled breath, and is termed calibration voltage.

Bag removal occurs at time 156 and is shown to be instantaneous. The instantaneous removal may be unrealistic but is depicted thusly for clarity of illustration. If the bag were removed more slowly, there would be no adverse effects on the timing.

As previously noted, impedance pneumograph 10 receives an electrical input signal from patient 102 corresponding to thoracic impedance changes due to respiration. This input is depicted as dashed line 9. However, the input signal peak is not necessarily constant from patient to patient for equal volumes of exhalation. Each patient provides a unique (but similarly shaped) electrical signal to the pneumograph corresponding to his particular thoracic impedance changes. For example, one patient provides a first signal having a peak corresponding to a particular volume of exhaled breath. A second patient need not necessarily provide an equal peak for the same volume of exhaled breath. A system without gain adjustment that is used from patient to patient would almost always give erroneous volume measurements. Thus system gain calibration prior to monitoring the next patient's respired breath volume is needed to set gain of the system to properly accommodate the next patient's signal peak.

The end of duration 153 is termination of exhalation, and at the same time (as herein depicted) is beginning of inhalation as depicted by duration 157. At the beginning of inhalation, detector 202 provides an output to cause a change of state from closed to open in switch 30 and from open to closed in switch 40 but can only cause a change of state in switch 40 since switch 30 is already open. Thus, switch 40 closes and this is depicted by duration 165 whose beginning is simultaneous with beginning of duration 157.

Upon closure of switch 40 capacitor 18, which has been discharged, charges from zero volts to a voltage which has been stored on capacitor 14. This stored voltage is calibration voltage, which corresponds to the fixed bag volume of exhaled breath. The voltage is amplified in amplifier 19, and applied to one end of potentiometer 20. Wiper 50 picks off a small fraction of this voltage and applies it to amplifier 22. The output of amplifier 22 is fed back through closed switch 90' to an input of differential amplifier 52 as a feedback voltage. The output of amplifier 52 is proportional to the difference between its two inputs and is thus reduced from its previous output value. The difference voltage is termed an error voltage. The "new" output value causes motor 61 to reposition wiper 50. Thus, wiper 50 acquires yet another voltage value and causes repetition of this procedure. Of cause, this happens continuously and not discretely in a typical closed loop fashion.

The wiper thus comes to rest at a position on potentiometer 20 that causes amplifier 22 to provide an output voltage equal to reference voltage 8, because for this condition of equality, the output of amplifier 52 is zero. Zero output from amplifier 52 causes relay 56 to de-energize and movable elements 60 and 63 revert back to their former positions as depicted. Thus, the wiper is not driven any further. The system is thus calibrated since the wiper position provides the readout device with a value of voltage equal to reference voltage 8 when the system is measuring a calibrated volume.

Return of movable contact 63 back to terminal 65 causes a positive step voltage to be applied on conductor 70 to input R of flip flop 100. This causes flip flop 100 to change state and Q-output from flip flop 100 on conductor 101 changes from high to low, i.e., to zero volts. This in turn, causes bag full enable gate 90 and gate 90' to de-energize their relay coils 92 and 92' respectively. Element 91 is moved to an open position. This disables gate 90.

Element 91' is moved to contact fixed reference voltage 8. This causes the same fixed reference voltage to continue to be applied to both inputs. Therefore, coil 56 (which was previously de-energized due to equal inputs to amplifier 52), stays de-energized. (There is no switching time problem because switch 90' can be selected to be much faster than relay 56).

Switch 90' is needed for the following reason. If a conductive connection is maintained between the output of amplifier 22 and an input to amplifier 52 when the system is used for measurement of volume, any measured respired volume that is smaller than the bag volume will allow relay 56 to energize. This will of course cause motor 61 to disturb the calibrated setting. Thus, switch 90' is arranged to conduct reference voltage 8 to that input of amplifier 52 when the system is in use. After the system has been thus calibrated, it is ready for measurement.

Dotted duration 162 represents a duration which would have occurred had the closure of switch 30 not been truncated by the occurrence of a bag full signal on conductor 105. Cross-hatched areas 160 and 164 represent an uncertain condition wherein switches 30 and 40 may either be closed or opened. This is an indeterminant period which occurs prior to calibration, but thereafter, positions of these switches are certain.

Durations 154 and 163 are equal and concurrent and represent exhalation and closure of switch 30 respectively. Durations 158 and 166 are equal and concurrent and represent inhalation and closure of switch 40 respectively. These four time periods represent those typical of operation of the apparatus after it has been calibrated. The apparatus continues to function in this manner thereafter, unless recalibrated for some reason.

The invention may be embodied in other specific forms without departing from the spirit or essential characteristics thereof. The present embodiments are therefore to be considered in all respects as illustrative and not restrictive, the scope of the invention being in-

What is claimed is:

1. A method of automatically calibrating an electronic respiration monitoring system including (1) impedance means responsive to changes in thoracic impedance of a breathing patient for providing an analog signal proportional to breath volume and (2) a volume-calibrated inflatable bag, said method comprising the steps of:
   a. operatively associating said impedance means with the thorax of said patient;
   b. positioning said bag in association with said patient, said bag arranged to capture gases exhaled by said patient;
   c. determining maximum filling of said bag; and,
   d. automatically calibrating said system upon the filling of said bag.

2. A method as recited in claim 1 and wherein said system is arranged to measure tidal volume of respiration, said method further comprising the steps of:
   e. activating a calibration switch to concurrently obtain zero system gain, discharge residual voltage from a second capacitor, and enable two gates;
   f. charging a first capacitor by said analog signal during exhalation into said bag;
   g. obtaining a trigger signal upon inflation of said bag to its maximum volume;
   h. passing said trigger signal through one of said gates;
   i. stopping the charging of said first capacitor in response to said trigger signal;
   j. holding steady the voltage of said charged first capacitor as a calibration voltage;
   k. transferring said calibration voltage from said first capacitor to said second capacitor during inhalation to obtain a transferred calibration voltage;
   l. said transferred voltage activating a servo loop through the other of said gates to obtain calibrated gain; and,
   m. disabling both of said gates to ready said system for tidal volume measurement.

3. A method as recited in claim 2 and wherein the step of activating said servo loop further comprises:
   n. activating a motor in response to said transferred calibration voltage;
   o. driving a potentiometer wiper by said motor to obtain a feedback voltage;
   p. subtracting a reference voltage from said feedback voltage to obtain an error voltage; and,
   q. applying said error voltage to said motor to position said potentiometer wiper.

* * * * *